Patented Mar. 22, 1932

1,850,381

UNITED STATES PATENT OFFICE

GEORGE A. CODE, OF DETROIT, MICHIGAN, ASSIGNOR TO E. E. STEVENS, IDA S. PITMAN, MARK R. CODE, CHAS. E. OVENSHIRE, AND WALTER C. BAKER, AS TRUSTEES

PROCESS OF PRODUCING STEEL

No Drawing.    Application filed January 14, 1929. Serial No. 332,554.

My invention relates particularly to the reduction of iron ore admixed with the ores of other metals, and provides an improved process whereby iron and its alloys, by a single or one-step process, may be reduced to the form of steel, either pure steel or steel alloy. The steel or steel alloy thus produced, may, by certain variations of the process, be brought down in various forms ranging from what is properly designated as a soft or mild steel to a very hard steel, such as tool steel or even a harder steel, and to a degree of hardness and tensile strength which resists cutting and forging. The process can be best carried out in an electrical induction furnace, (although the process is not limited to the use of such a furnace) in which the ores and the reducing agents in flux hereinafter described should be placed before the heat is turned entirely onto the furnace.

Before discussing the broad or underlined features of the invention, I will describe in detail one of the several successful ways in which the process has been carried out in actual practice. It is understood that I am not limited in my invention by the exact proportion of reacting materials, by the time, or by the exact temperature cited in the example given below.

Example No. 1

Into the furnace place twenty-five grams of mucic acid, the nplace therein approximately fifteen pounds of dressed ore (e.g. 63% iron content), such for example, as comes direct from Minnesota mines. On top of the above mixture place a fluxer consisting of two and one-half pounds of lime and one hundred grams fluorspar. Turn on the heat to produce temperatures as follows: First hour, twenty-five hundred degrees F.; second hour 2650 degrees F.; third hour 2850 degrees F.; and during approximately one-half of the fourth hour a furnace temperature of 2900 degrees F.

During the last approximate half hour in the above process, if the steel is found deficient in the requisite amount of carbon, a proper amount of charcoal can be mixed into the molten mass, or if too much carbon is present, the high temperature can be maintained until a proper percentage of carbon in the molten steel is attained. The above suggested addition of carbon is not for the purpose of reduction, but to supply a carbon content necessary for the inter-crystalline cement of the steel. In many instances the addition of further carbon will not be necessary, and in no instance will carbon be added in an amount which in any way is comparable with or equal to the amount of carbon heretofore used in the reduction of iron ore.

The end product produced by the above process, where the metal of the ore is entirely iron will be a true steel, but where the ore contains other metals such as manganese, nickel, cobalt, copper, tungsten, vanadium, chromium, lead, etc., for example, or are purposely added, the end product will be a steel alloy, but in any instance the final product will be produced by a single step process as distinguished from a two-step process such as has been hitherto employed wherein the ore is first reduced to pig iron, and by a second step is reduced from pig iron to the form of a steel, or by further processes to a steel alloy.

I am unable to state the exact chemical or physical reactions that take place in the above process, but the results of the process have been definitely established. The fact that the desired results have been and may be attained by quantities of reducing agencies which in themselves are too small (as small as three-fourths of one per cent) for the requirements of the accepted chemical equations depicting the reduction of iron ore, seems to indicate that the organic compound which is added, or some subsequent decomposition product of such added organic compound, is the active agent and acts as a catalyst. In the end product, a large proportion of the oxygen sufficient to effect a recovery of over ninety-five per cent of the iron or other metal disappears in a manner unknown to me, but I believe the oxygen of the iron ore is disassociated through catalytic action at much lower than the normal disassociated temperatures.

To date, I have obtained the best results by the use of mucic acid which, of course, is an organic compound, but I have obtained results differing only in degree by the use of other organic compounds, which are more or less closely related in their chemical structure to mucic acid, such as citric acid, tartaric acid, and oxalic acid. These substances are all polycarboxylic acids. The polycarboxylic acid employed may or may not contain one or more substitute groups in the organic acid. I have found that various different polycarboxylic acids will combine with the flux to produce a catalytic action with the general results above stated, but so far as my present experiments have gone, the polycarboxylic acids which produce the above action in the flux are of the aliphatic or chain type. As to time and temperature I have found that while under the conditions of my experimentation the best results can be obtained by quite closely following the instructions of the above given Example 1, I do not wish to be limited to the exact temperatures and the conditions which are noted.

The results obtained indicate that the action of the organic reagent is a catalytic reaction hitherto unknown, and that, in connection with the flux or other elements present, such a process serves to free the iron from oxygen, but at the present date I am unable to state just what this catalytic agent is, or exactly in what manner it reacts. I do know however, that by the use of a certain class of organic chemical compounds which, in themselves have insufficient carbon and hydrogen content to affect the reduction by exchange of their carbon and hydrogen elements, nevertheless, the reaction produced causes a disassociation of the oxygen from the iron ore at approximately the temperatures indicated and by approximately the treatment outlined in Example No. 1 above. This action, for lack of a more definite term, I have designated as a catalytic action that causes a disassociation of the oxygen from the iron ore, the iron of the ore being recoverable in the form of steel or of steel alloys in the event that the original ore batch contained other mixed metallic ores or oxides. The foregoing reaction described as catalytic, like the mass replacement reactions it supplants, can be shown to take place in two stages, the first stage resulting in black scale or ferrous oxide when the temperature is kept down below five hundred degrees F., in fact, this is the reaction that is most easily adduced and best lends itself to study. Likewise it parallels the mass displacement reactions in being reversible, and under proper conditions the metallic oxides will catalyze the organic compounds used in the above catalysis, the end products being water, esters and hydroxides, or sometimes unsaturated hydrocarbons.

Mucic acid is the preferred one of a number of dicarboxylic organic compounds, or of organic compounds containing both carboxyl and hydroxyl groups that have been found useful in carrying out the process above disclosed, and it belongs to that group of organic chemical compounds, that, although they contain very much less amount of hydrogen and carbon than is theoretically necessary to reduce iron ore, assuming that all the carbon and hydrogen of the reagent unite with the oxygen of the iron ore to form carbon dioxide and water; nevertheless, they bring about a reduction and allow for the reduction to steel and to steel alloys. Mucic acid will bring about such a reduction when present in an amount which is only approximately three percent or less, of the amount of hydrogen and carbon which would be theoretically calculated as necessary under the hitherto known process just above referred to, and yet this organic compound, for which mucic acid has been found the preferred substances, under conditions of my experimentation, has been found capable of producing the results obtained in the single step process herein disclosed and broadly claimed. To understand the process one must comprehend the added functions of the flux, which in the old process merely takes care of the gangue. In my process it may take a secondary part in the reduction process inasmuch as it may serve to bind the nonmetallic portion of the ore momentarily disassociated from its metallic portion, in fact, unless there is some such secondary factor, so acting (as the physical separation of the gas oxygen in the oxide ores) or the formation of lime silicate in the silicate ores, the freed oxygen or the freed silicon dioxide, will set up a mass action and reverse the process. This is what happens I believe with the sulfide ores. They will reduce up to three or four per cent in the case of alloy sulfides, but it requires some effective sulphur absorbent as carbide of lime, to effect successful reduction of the sulfide ores. The flux likewise protects the catalytic agent from destructive distillation disassociation and preserves the full value of the group therein active in catalysis.

What I claim is:

1. A single step process of reducing iron ores and suitable admixtures of ores to the form of true steel and its alloys which consists in melting the ore or ores while commingled with a flux and mucic acid, the mucic acid being in proportion from fifteen to thirty-five grams for fifteen pounds of ore, thereby reducing the same to the form of true steel or its alloys.

2. A single step process of reducing iron ores and admixtures of ores to the form of true steel and its alloys which consist in melting the ore or ores while commingled with a flux and a polycarboxylic acid in the proportion of from fifteen to thirty-five grams for fifteen pounds of ore, thereby reducing the same to the form of true steel or its alloys.

3. The process of reducing ores and admixtures of ores which consists in melting the same while commingled with a polycarboxylic acid, in the proportion of from fifteen to thirty-five grams of polycarboxylic acid for fifteen pounds of ore, which has the property of causing a disassociation of the non-metallic from the metallic portion of the ore or mixtures of ores, thereby reducing the same to the form of true steel or its alloys.

4. The process of reducing iron ores and suitable admixtures of ores to the form of true steel or steel alloys which consists in melting the ore or ores while commingled with a polycarboxylic acid, the polycarboxylic acid being in the proportion of fifteen to thirty-five grams for fifteen pounds of ore, that is present in an amount which has insufficient carbon and hydrogen content to effect the reduction by exchange of its carbon and hydrogen elements, but which has the property of causing dis-association of the non-metallic from the metallic portions of the iron or other ores or mixtures of ores, whereby the same is reduced to the form of true steel or its alloys.

5. The process of reducing iron ore and suitable admixtures of ores to the form of true steel or steel alloys, which consists in melting the same while commingled with a polycarboxylic acid, the polycarboxylic acid being in the proportion of fifteen to thirty-five grams for fifteen pounds of ore, and a flux, and which acid, in the presence of the flux, has the property of effecting a catalytic action that causes a dis-association of the non-metallic from the metallic substances, thereby reducing the same to the form of true steel or its alloys.

6. A single step process of reducing iron ore and suitable admixtures of ores to the form of true steel and steel alloy, which consists in melting the ore or ores while commingled with a polycarboxylic acid, the polycarboxylic acid being in the proportion of fifteen to thirty-five grams for fifteen pounds of ore, and a flux, and which acid, in the presence of the flux, has a catalytic action and has the property of causing dis-association of the non-metallic from the metallic portions of the ore or mixtures of ores, thereby reducing the same to the form of true steel or its alloys.

In testimony whereof I affix my signature.

GEORGE A. CODE.